No. 784,646. PATENTED MAR. 14, 1905.
W. W. WILLSON.
SELF OILING WHEEL.
APPLICATION FILED MAY 4, 1901.
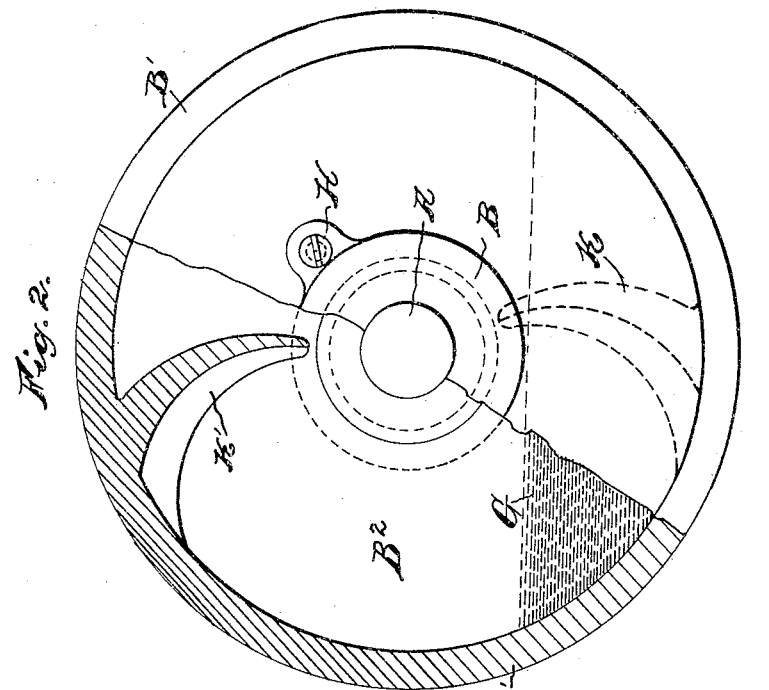
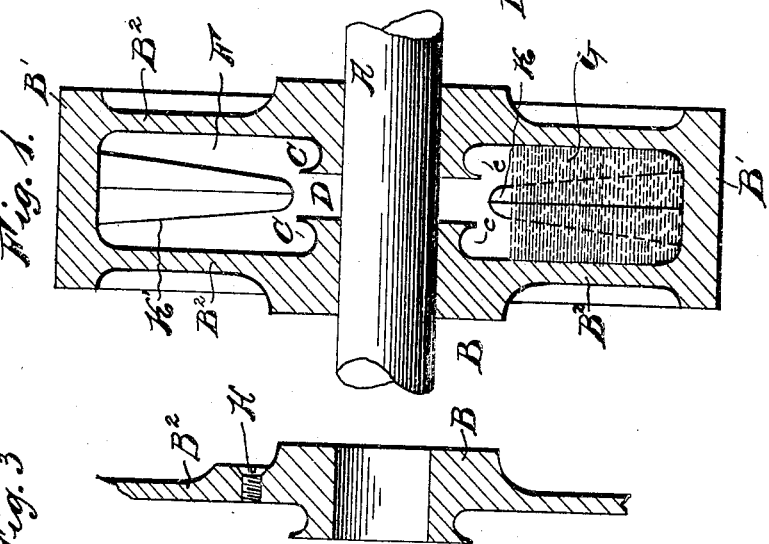
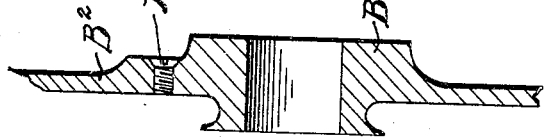
Witnesses
A. E. Williams Jr.
N. Curtis Lammond
Inventor
William W. Willson
By H. H. Bliss
Attorney No. 784,646. Patented March 14, 1905.

UNITED STATES PATENT OFFICE.

WILLIAM W. WILLSON, OF COLUMBUS, OHIO, ASSIGNOR TO JOSEPH A. JEFFREY, OF COLUMBUS, OHIO.

SELF-OILING WHEEL.

SPECIFICATION forming part of Letters Patent No. 784,646, dated March 14, 1905.

Application filed May 4, 1901. Serial No. 58,681.

*To all whom it may concern:*

Be it known that I, WILLIAM W. WILLSON, a citizen of the United States, residing at Columbus, in the county of Franklin and State of Ohio, have invented certain new and useful Improvements in Self-Oiling Wheels, of which the following is a specification, reference being had therein to the accompanying drawings.

Figure 1 is a transverse sectional view through a wheel constructed in accordance with my invention. Fig. 2 is a view, partially in side elevation and partially in section, of the same. Figs. 3 and 4 are detailed views.

A designates a shaft on which is mounted a wheel consisting of a hub B, rim B', and webs or connecting portions $B^2$. The hubs B are extended inward beyond the inner lines or faces of the webs $B^2$, (indicated at C,) the inner faces of said portions being separated by a relatively narrow space D. Each of said inwardly-extending projections C is provided with a peripheral groove $c$, which forms the inner wall of a relatively large chamber F. Oil, as at G, is introduced to this chamber F through an aperture or passage formed in one of the sides of the wheel and adapted to be closed by means of a threaded plug H.

K K' designate inwardly-projecting tines or oil-distributing fingers which extend from the inner face of the rim B' to substantially the periphery of the projections C on the hub, the inner ends of said tines being in line with the aforesaid space D. Said tines are preferably made of the form shown in the drawings, being concaved on one face and gradually decreasing in width or thickness from their outer to their inner ends. The convex surface of the tine K is oppositely arranged to the corresponding surface of the tine K', so that oil may be raised from the lower portion of the chamber F and delivered to the shaft A irrespective of the direction in which the wheel is revolving.

The manner of the action of the above-described parts will be readily understood. The oil collects at the lowest portion of the chamber F, and as the wheel revolves a portion thereof will be raised by one of the cup-shaped tines or projections and deposited upon the shaft A through the passage D. Thus the shaft will be constantly lubricated without the attention on the part of an attendant beyond an occasional adding of oil to the chamber F.

I have above described my improved self-oiling wheel irrespective of the manner of constructing the same. I now call attention to matters of improvement which I have devised in order to manufacture wheels of this character with the least expense and with a large capacity for a lubricant. I cast all of the parts that have been described integral, providing a large core for the central chamber so constructed as to leave a large open space between the hub parts and the rim and between the two side webs. This avoids the necessity of any machine-work, such as would be requisite if the wheel was formed in several parts, which must be fitted together with oil-tight joints. The only machine-work required with this wheel is the boring of the shaft-aperture and the truing of the periphery.

What I claim is—

1. A self-oiling wheel having the rim, the separated hubs arranged to expose the entire periphery of the shaft within the oil-chamber, the two-face webs, each integral with a hub-section and both with the rim, and the integral oil-lifting tines or fingers in transverse planes between the inner ends of the hub-sections, substantially as set forth.

2. A self-oiling wheel, having the rim, the two-face webs, the two hub-sections, each projecting inward from a web and arranged to expose the entire periphery of the shaft within the oil-chamber, and having a peripheral groove, and the oil-lifting tines or fingers, all arranged to provide the relatively enlarged oil-chamber extending from the rim to the shaft-aperture, substantially as set forth.

In testimony whereof I affix my signature in presence of two witnesses.

WILLIAM W. WILLSON.

Witnesses:
L. C. PARROTT,
E. P. HORNE.